United States Patent [19]
Frey

[11] Patent Number: 6,029,168
[45] Date of Patent: Feb. 22, 2000

[54] DECENTRALIZED FILE MAPPING IN A STRIPED NETWORK FILE SYSTEM IN A DISTRIBUTED COMPUTING ENVIRONMENT

[75] Inventor: Alexander H. Frey, Wayzata, Minn.

[73] Assignee: Tricord Systems, Inc., Plymouth, Minn.

[21] Appl. No.: 09/012,267

[22] Filed: Jan. 23, 1998

[51] Int. Cl.[7] .................................................. G06F 17/30
[52] U.S. Cl. ............................... 707/10; 707/8; 340/825; 345/424
[58] Field of Search ................................. 707/3, 8, 9, 10, 707/201, 202, 203, 205, 206; 711/150; 345/424, 31, 335; 340/825; 709/104, 219; 364/228, 222, 943; 714/16, 6

[56] References Cited

U.S. PATENT DOCUMENTS

| | | | |
|---|---|---|---|
| 4,633,245 | 12/1986 | Blount et al. | 340/825 |
| 4,827,399 | 5/1989 | Shibayama | 707/202 |
| 5,001,628 | 3/1991 | Johnson et al. | 707/10 |
| 5,113,519 | 5/1992 | Johnson et al. | 707/201 |
| 5,327,553 | 7/1994 | Jewett et al. | 364/200 |
| 5,497,457 | 3/1996 | Ford | 714/6 |
| 5,502,811 | 3/1996 | Ripberger | 714/6 |
| 5,511,177 | 4/1996 | Kagimasa et al. | 711/114 |
| 5,513,314 | 4/1996 | Kandasamy et al. | 714/6 |
| 5,513,459 | 5/1996 | Schneider | 40/641 |
| 5,522,032 | 5/1996 | Franaszek et al. | 714/6 |
| 5,524,205 | 6/1996 | Lomet et al. | 714/16 |
| 5,692,178 | 11/1997 | Shaughnessy | 707/8 |
| 5,751,928 | 5/1998 | Bakalash | 345/424 |
| 5,764,972 | 6/1998 | Crouse et al. | 707/10 |

OTHER PUBLICATIONS

"The Zebra Striped Network File System," Hartman et al., ACM Transactions on Computer Systems, vol. 13, No. 3, 1995, pp. 274–310.

"Serverless Network File Systems," Anderson et al., ACM Transactions on Computer Systems, vol. 14, No. 1, 1996, pp. 41–79.

Primary Examiner—Wayne Amsbury
Assistant Examiner—Thu-Thao Havan
Attorney, Agent, or Firm—Trop, Pruner, Hu & Miles, P.C.

[57] ABSTRACT

The invention discloses apparatus and process in which data files are distributed across a large scale data processing system to enable balance of work loads and storage loads at a plurality of nodes. Specifically, the invention provides significant advances in data base management by distributing meta-data in a plurality of file storage nodes to isolatively and distributively store file data in a distributed computing environment. This provides efficient allocation of storage space and work loads among nodes.

16 Claims, 8 Drawing Sheets

DECENTRALIZED FILE MAPPING IN A STRIPED NETWORK FILE SYSTEM IN A DISTRIBUTED COMPUTING ENVIRONMENT

TECHNICAL FIELD

The present invention relates generally to file systems in a distributed computing environment and, in particular, to a method of decentralized control of the mapping of files to disk space striped across shared networked storage units in a distributed computing environment.

BACKGROUND OF THE INVENTION

Many large scale data processing systems now employ a multiplicity, often referred to as a cluster, of independent computer systems, all of which operate concurrently on discrete problems or portions of problems. An independent computer system is called a node of a multi-processing system cluster. In such systems, some of the nodes may be used for storage and maintenance of data files. These file serving nodes may be a single file server or a collection of file servers. In such a large scale data processing system, it is desirable to have data files distributed across the system so as to balance nodal work loads and storage loads. It is also desirable to protect against significant losses of critical data should one or more nodes malfunction. It is also desirable to enable several servers to share a large pool of storage (e.g disks) without having to partition and preassign ownership of the storage to particular ones of those servers that are sharing the storage space.

Generally a node refers to a workstation connected to a local area network (LAN). Specifically a node is a computer, repeater, a file server or similar peripheral device used to create, receive or repeat a message. For example a personal computer may be used as a node member in a data processing network. Further, in a network, data communication links are used to tie together various computer systems to allow the sharing of information and resources. For example, a LAN which ties together all PC's in a word processing department can enable users to access a common template of files or print on a single high speed laser printer. A PC may also serve as a node in a world wide area network (WAN) where mainframes and PCs are remotely connected. As well as functioning as a node, a PC may serve as a network host. Generally, in the context of the present invention, the word "node" is used to refer to a point where one or more functional units interconnect channels or data circuits in a data network. The word may also refer to the point at an end of a branch in a network.

A striped network file system with multiple servers offers the potential to achieve very high performance using multiple collections of inexpensive computers and disks. Also, distributing file data across a plurality of servers and storage devices provides the potential for improved data recovery in the event of a failure of any server or storage device if redundancy is added to critical data.

A striped network file system implemented over multiple servers in a distributed computing environment highlights and poses design issues such as how and where to store a file's resource information and how to allocate space to files. File resource information includes information as to the allocation of physical disk space, allocation of logical file blocks relative to physical disk space, data integrity mechanisms such as parity checks, and data security measures such as access control mechanisms.

*The Zebra Striped Network File System* (Hartman et al 1995) describes a striped network file system that batches small files together into a sequential log, divides the log into stripes and writes the larger, more efficient stripes to the servers. Each client creates its own log, so that each stripe in the file system contains data written by a single client.

However, the Zebra file system has several drawbacks. First, the Zebra file system implements a single file manager that provides a centralized resource for data block pointers and handles cache consistency operations. Use of centralized file manager is a potential performance bottleneck. In addition, the Zebra file system stripes each segment to all of the systems' storage servers which limits the maximum number of storage servers that Zebra can use efficiently thus limiting its scalability.

In addition, Zebra is designed to support UNIX workloads as found in offices and engineering environments. Such workloads are characterized by short file lifetimes, sequential file accesses, infrequent write-sharing of files by different clients and many small files. Zebra is not optimized to run database applications which tend to update and read large files randomly.

The *Serverless Network File Systems* (Anderson et al. 1996) resolves the centralized files resource manager problem by creating and distributing many copies of the file resource information for all files to each of the servers in the striped file system. More specifically, in a Serverless system, the file resource information for all files is stored in four key maps—manager map, imap, file directories and stripe group map (using file index numbers). These maps are globally replicated into the memory of each server. Thus, file resource information is available to all the servers in the striped file system.

In such a system, the difficulties in maintaining consistency across these map copies is monumental. Any changes in the file resource information must be incorporated into each map at each location in a manner that makes all the changes appear to be simultaneous, in order to maintain file system consistency. Writing and updating file resource information for each map at each location any time a change is made requires and incurs substantial file system overhead.

SUMMARY OF THE INVENTION

Accordingly, it is an object of this invention to provide a file-based striping structure and method for a distributed computing system cluster which decentralizes the storage of both files and the descriptive information about files. Specifically, the present invention provides a distribution of entries, such as fields and indexes or any commands that are used to describe and work with data, without replication of the entries. Thus, the present invention enables decentralization of information about actual file data (file meta-data). Further, the present invention provides, inter alia, significant database management advances and ease of data base manipulation in a distributed computing system.

It is another object of this invention to provide system-wide unique pointers for consistent, reliable access to distributed file data blocks. The present invention utilizes a specialized data element which enables indication of the location of another data element in a very diverse and distributed file data environment residing across several computing systems and storage devices.

It is another object of this invention to provide a distributed file mapping mechanism which optimizes use of physical storage capacity while minimizing file access overhead and eliminates any centralized control bottlenecks or replication of the mapping data. The invention utilizes, inter alia, techniques of distributed mapping to establish a set of values having a defined correspondence with the quantities or values of another set in a distributed computing environment.

It is a further object of this invention to provide a distributed file mapping mechanism which maps file block sizes of any variable predetermined size.

It is a further object of this invention to provide a distributed file mapping mechanism which can be used with almost any parity protection scheme for file data.

DESCRIPTION OF THE INVENTION

Figure 1:
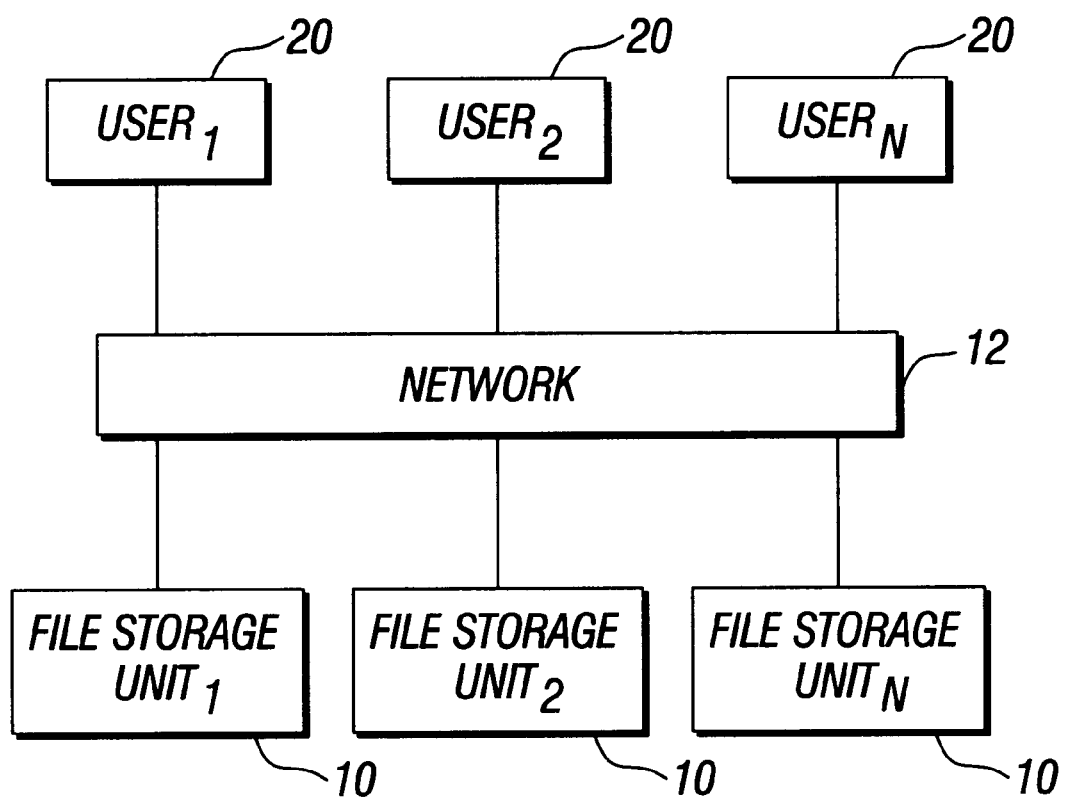
FIG. 1 is a block diagram of a network of communication interconnections of a multi-node parallel computing system.

Referring to FIG. 1, a block diagram is shown of a distributed computing system and comprises a number of user nodes 20, for example client CPUs or application servers that want to share access to data files, and a number of distributed storage unit nodes 10 all interconnected via high speed network 12.

Each node 20 is an independent computer system interacting with other nodes 10 via the communication network 12. It is understood by those skilled in the art that the distributed storage unit nodes 10 are dedicated to storage and maintenance of data files. These distributed storage unit nodes may be a single file server or a collection of file servers. It is understood by those skilled in the art that a distributed storage unit node can be defined as a software-based process, such as may occur in object-oriented programming environments, or can be defined as a specific physical computer system.

Figure 2:
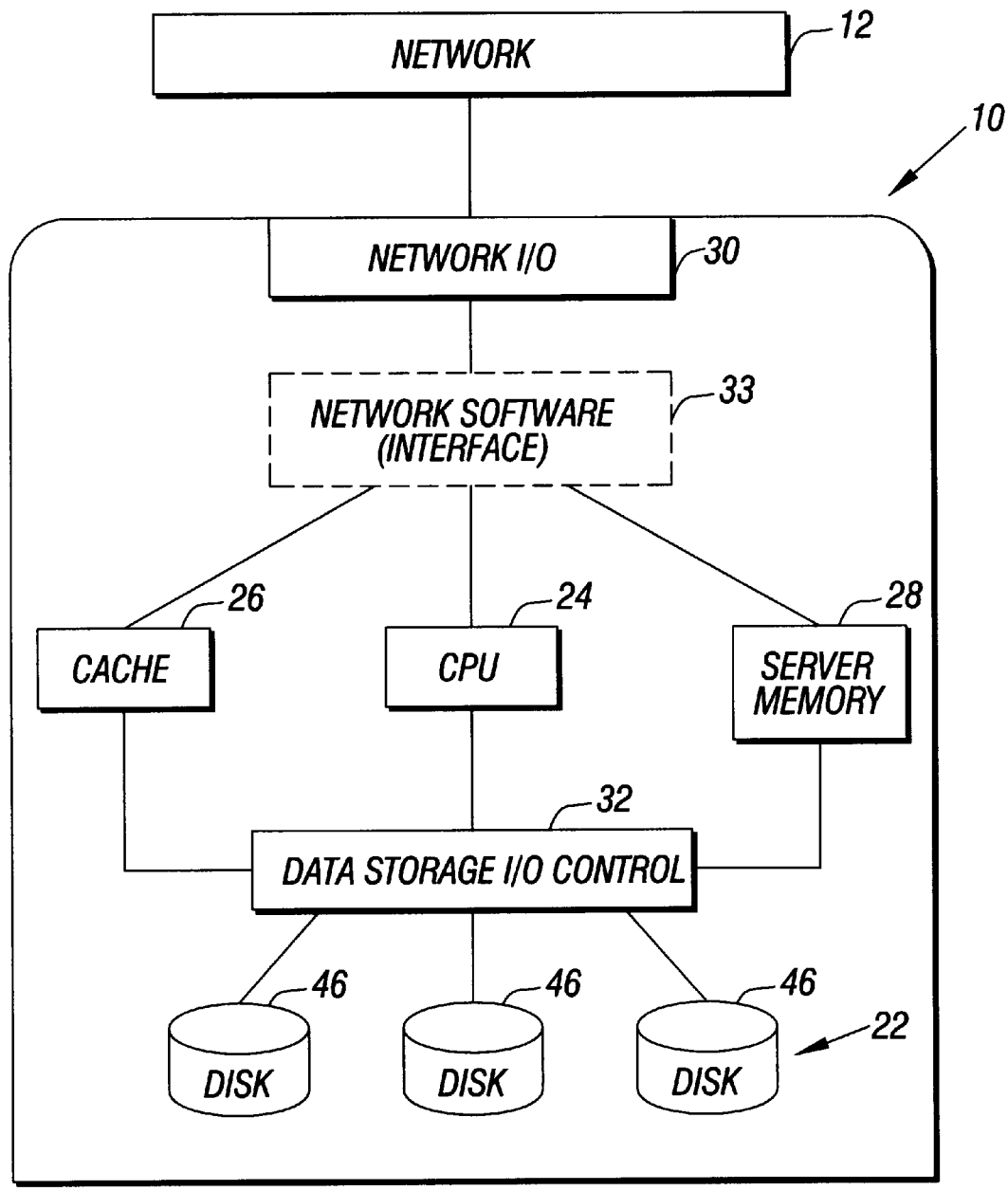
FIG. 2 is a block diagram illustrating the general configuration of a file node of FIG. 1.

For example, FIG. 2 is a block diagram depicting a distributed storage unit node 10 as a specific physical computer system. In accordance with FIG. 2, each node 10 comprises one or more physical data storage systems 22 connected to data storage I/O control 32. Further, node 10 includes microprocessor 24, cache 26, server memory 28, each connected to data storage I/O control 32 and Network software (interface) 33. Network software 33 is the interface to data communications Network I/O 30. In the preferred embodiment, node 10 in cooperation with Network 12 is allocated the task of servicing users with data, application software, mass storage and other utilities. The present system, for example and without any limitations, may use hardware like that manufactured by Adaptec, Mylex, Symbios, Compaq and many others. In the preferred embodiment, data storage system 22 includes one or more physical storage devices 46, such as, for example, disks found in any PC storage system. It is understood by those skilled in the art that data storage system 22 may be implemented in any physical storage devices 46, such as, for example, optical disks, tape drives, or RAM drives.

The distributed computing system network software 33 coordinates interaction between nodes and file management system software to, inter alia, enable data storage and retrieval for striped files. File resource information includes information matching logical file blocks to physical addresses in the data storage system 22. Two examples of prior art methods of file management of striped files across file nodes 10 are shown in FIGS. 3A and 3B.

Figure 3A:
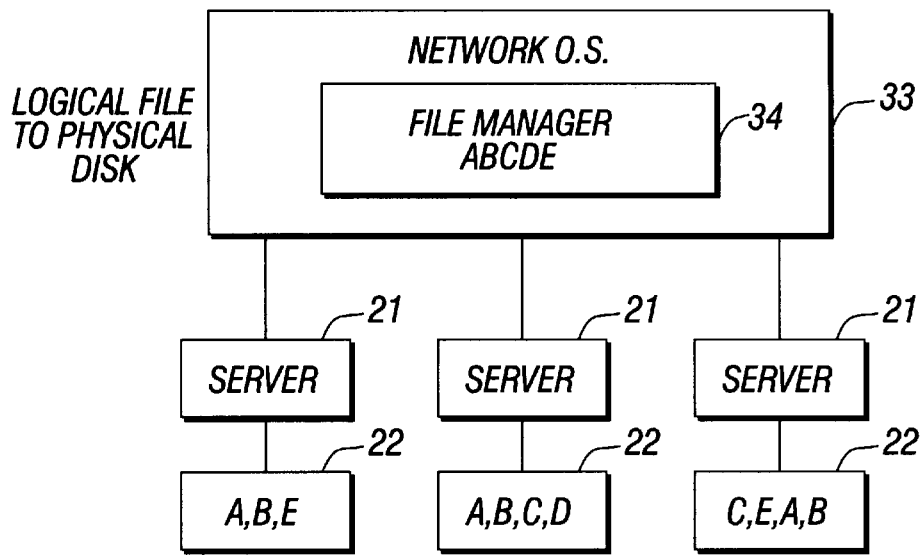
FIGS. 3A and 3B show block diagrams illustrating prior art methods of organizing file resource information across file nodes.

Prior Art Example 1 of FIG. 3A is a block diagram showing files striped across multiple servers with a centralized network file manager such as, for example, in the Zebra file system. File resource information for all files is organized in a single network file manager 34 which is implemented and operates in network software, i.e. the network operating system 33. More specifically, in FIG. 3A, each server node 21 is connected to a single data storage system 22. Each data storage system 22 (here, a disk) is shown divided into stored file blocks labeled according to the file A, B, C, D or E from which the block originated. Files A and B each include three file blocks with each of the file blocks stored on a different server node 21. Files C and E include two file blocks with each of the file blocks stored on a different server. File D includes a single file block stored on a single server. Management of file resource information for files A, B, C, D and E occurs at the centralized file manager level.

Figure 3B:
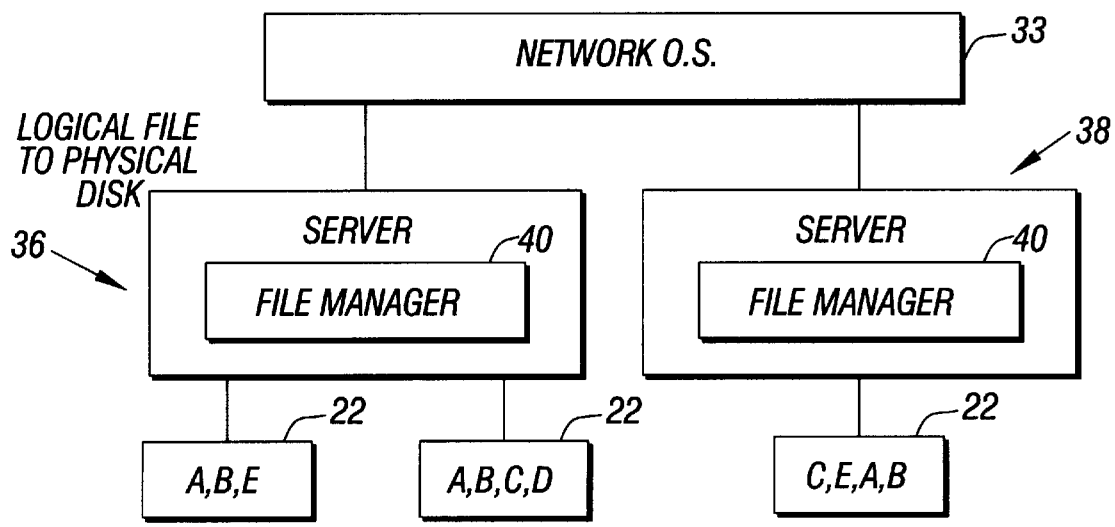

Prior Art example of FIG. 3B is a block diagram showing files A, B, C, D and E striped across multiple servers with file managers 40 operating at the server level such as, for example, in the Serverless file system. More specifically, Example 2 shows files A, B, C, D and E striped across two server nodes, a first server node 36 and a second server node 38. The first server node 36 includes a server file manager 40 and a plurality of disks 22. The server file manager 40 organizes file resource information for all files stored across all servers 36, 38 at the server level. In this example, file blocks for files A and B are stored on two different disks within node 36 and on a disk in node 38. File blocks for files C and E are stored on a disk in each node 36, 38. The file block for File D is stored on a disk of node 36. The mapping of file blockers to disk blocks is replicated on both node 36 and node 38.

Figure 4:
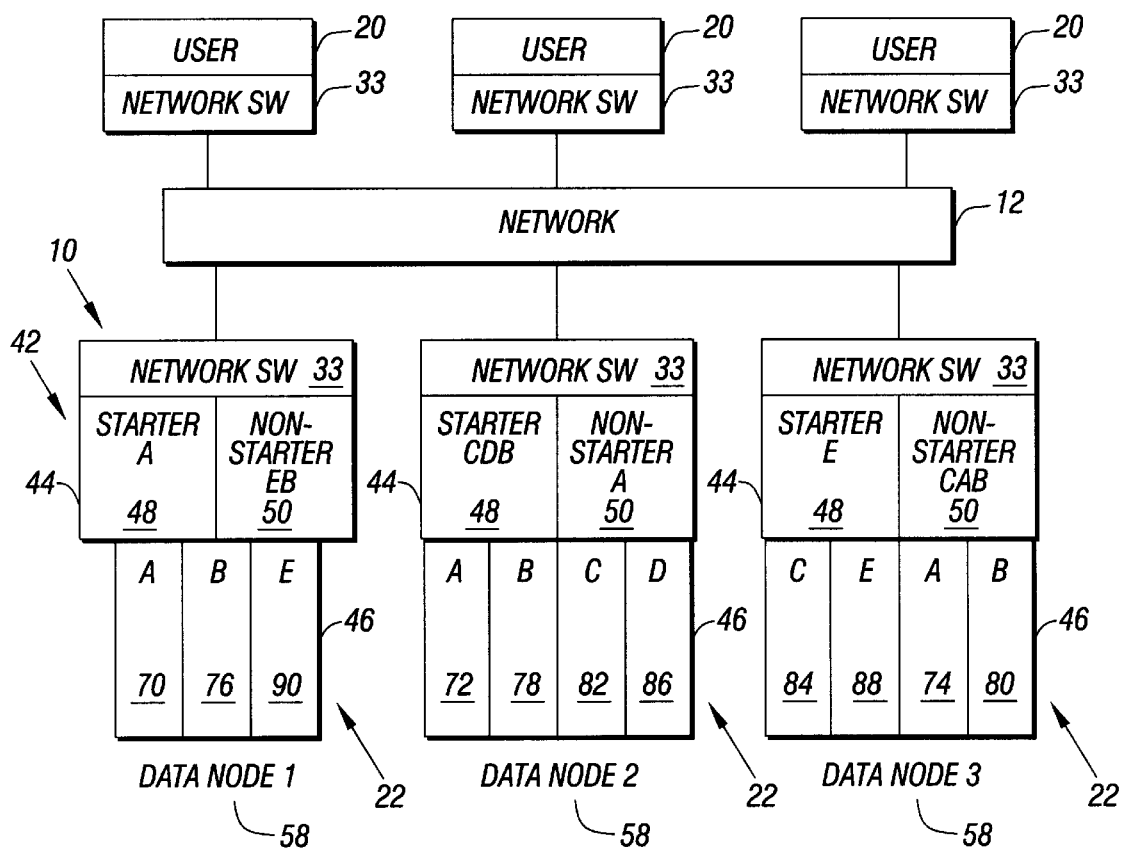
FIG. 4 is a block diagram illustrating a method of organizing file resource information across file nodes in accordance with the present invention.

Referring now to FIG. 4, the block diagram illustrates a method of decentralized file resource information for file blocks striped across multiple distributed storage unit nodes in a distributed computing system in accordance with the present invention without replication of file block to disk block mapping. In particular, FIG. 4 depicts multiple nodes 10 connected into a network 12 via network software 33. Users access the nodes via similar network software 33. Each node 10 includes one or more data nodes 42. For ease of discussion, each distributed storage unit node 42 is labeled DATA NODE 1, DATA NODE 2 or DATA NODE 3 which generically is referred to as the data node identifier number, 58.

Each data node 42 includes a data storage system 22 and a file access manager 44. Each data storage system 22 includes one or more physical storage devices 46. The file access manager 44 coordinates data input/output operations between the user 20 and data storage system 22. Each file access manager 44 includes file resource information grouped as starter information 48 and non-starter information 50. Generally, starter information is data constructed when a file is created describing how that file is to be spread over a node. It is often efficient to include the mapping of file blocks to be stored on this node to their disk address in data storage system 22 with this starter information. For each file created, its starter information is stored in a table at a unique starter information index 49 (refer to FIG. 5).

Figure 5:
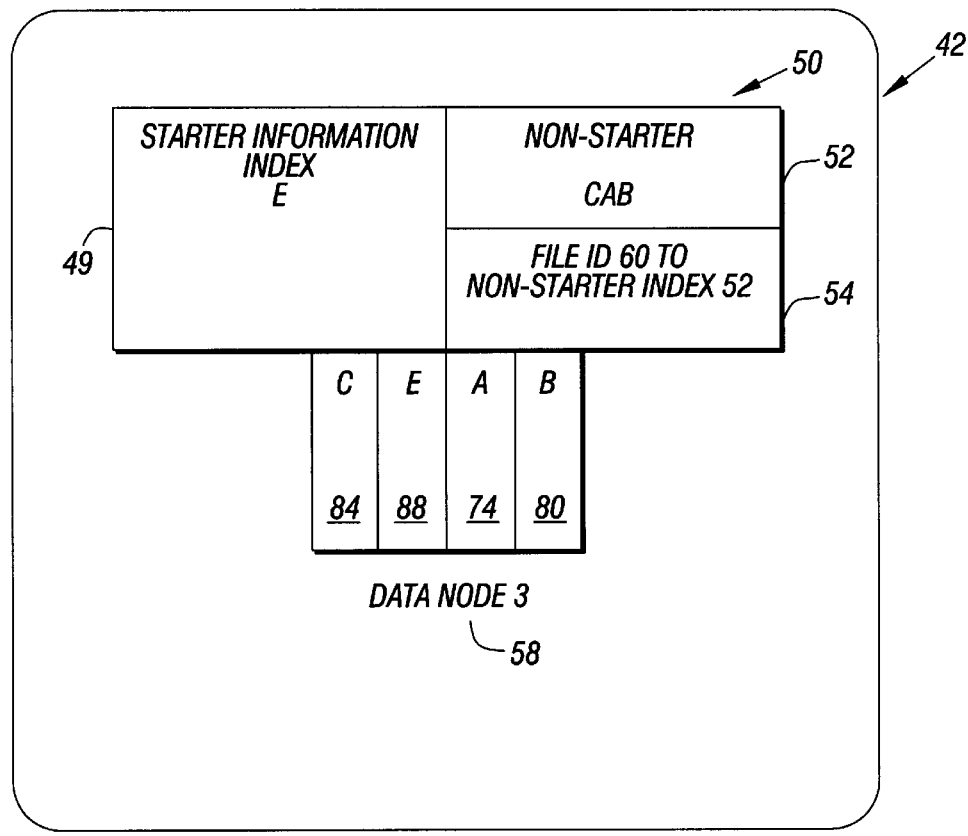
FIG. 5 adds the mapping from file ID 60 to node starter index to the block diagram depicting data Node 3 of FIG. 4.

Non-starter information 50 refers to file resource information for files in other nodes on which file data may be spread and then stored in the data storage system 22. Non-starter information 50 is stored in a table of non-starter information at a non-starter index 52 (refer to FIG. 5). A mapping 54 is shown in FIG. 5 from a unique file ID 60 to this associated non-starter index 52. The non-starter information at index 52 includes the mapping of file blocks to be stored on this node to disk addresses 68, refer to FIG. 7. File blocks are retrieved by accessing a file's, starter or non-starter information for the desired file block through use of a unique block identifier 56.

Figure 6:
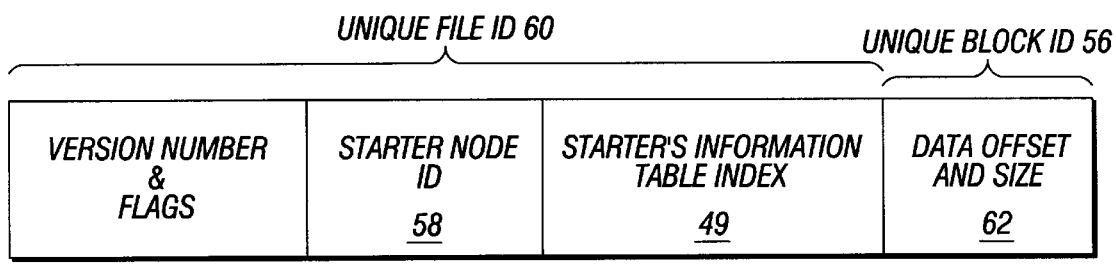
FIG. 6 is a diagram depicting the format of a data file block description.

Referring to FIG. 6, a unique block identifier 56 includes, at a minimum, the following information: unique file ID 60, data offset and data size 62 (in bytes from the start of the file). Further, the unique file ID 60 comprises: version number and flags, starter node ID 58, and starter's information table index 49.

Figure 7:
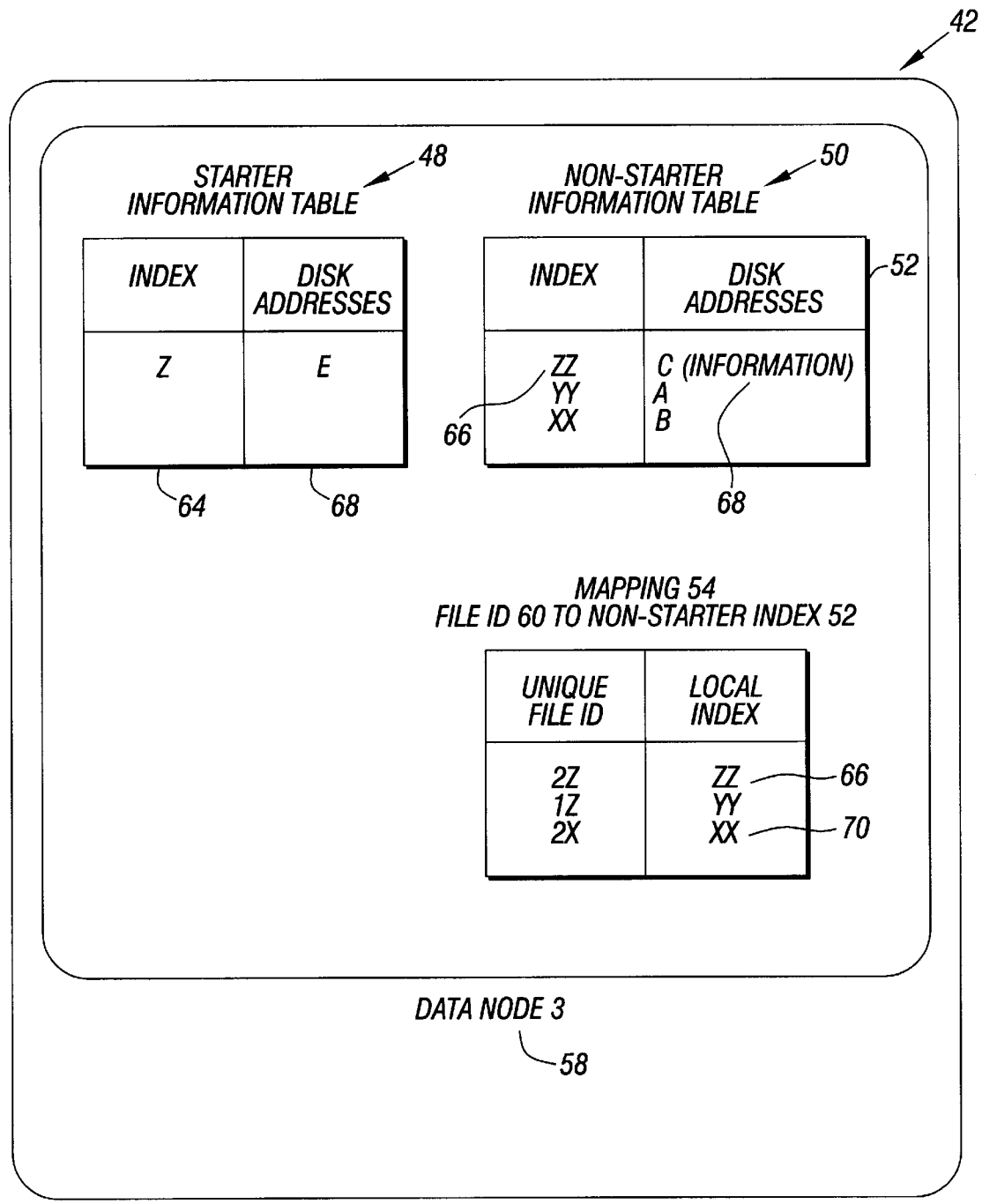
FIG. 7 describes the file meta-data structure in data Node 3.
Figure 8:
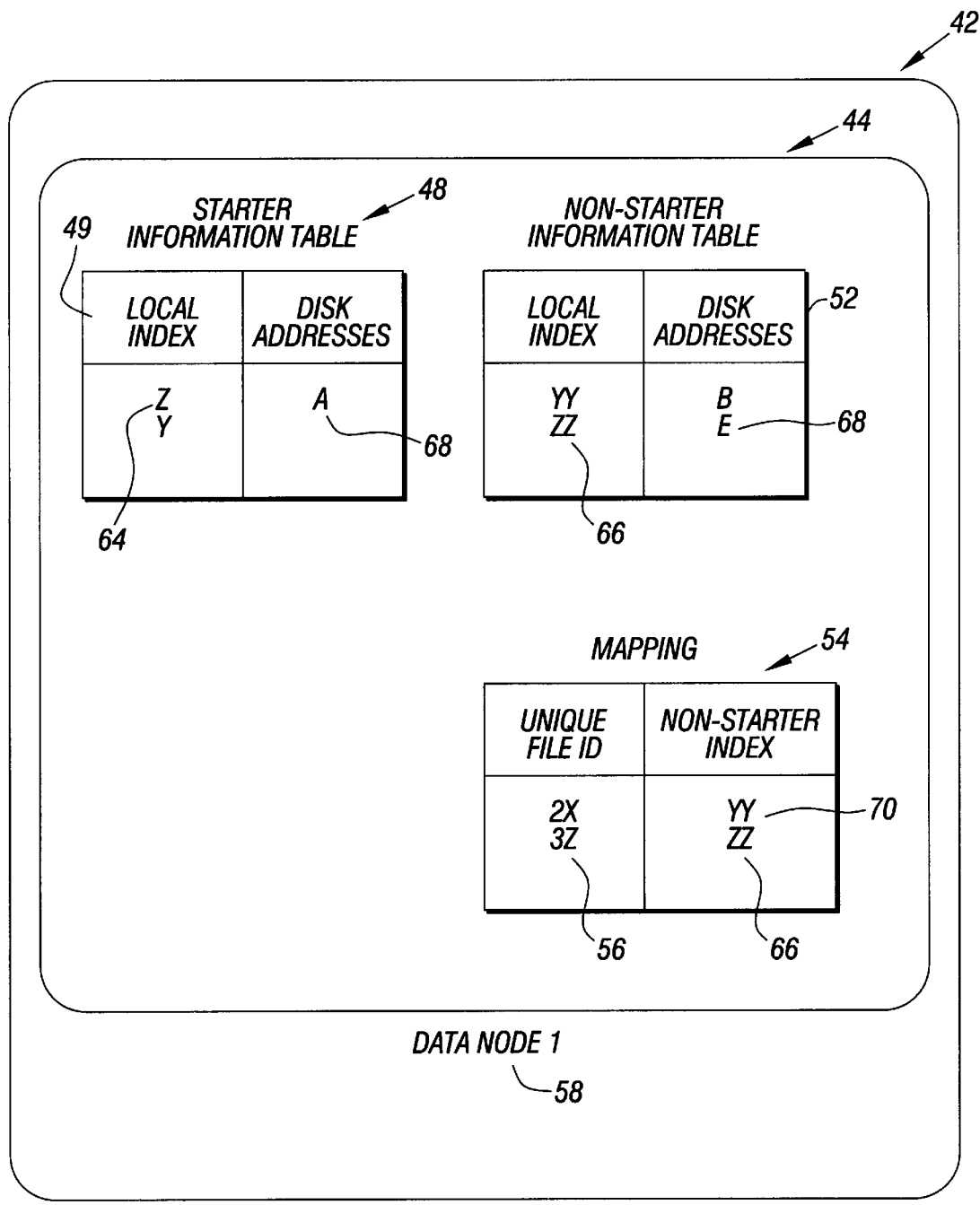
FIG. 8 describes the file meta-data structure in data Node 1.
Figure 9:
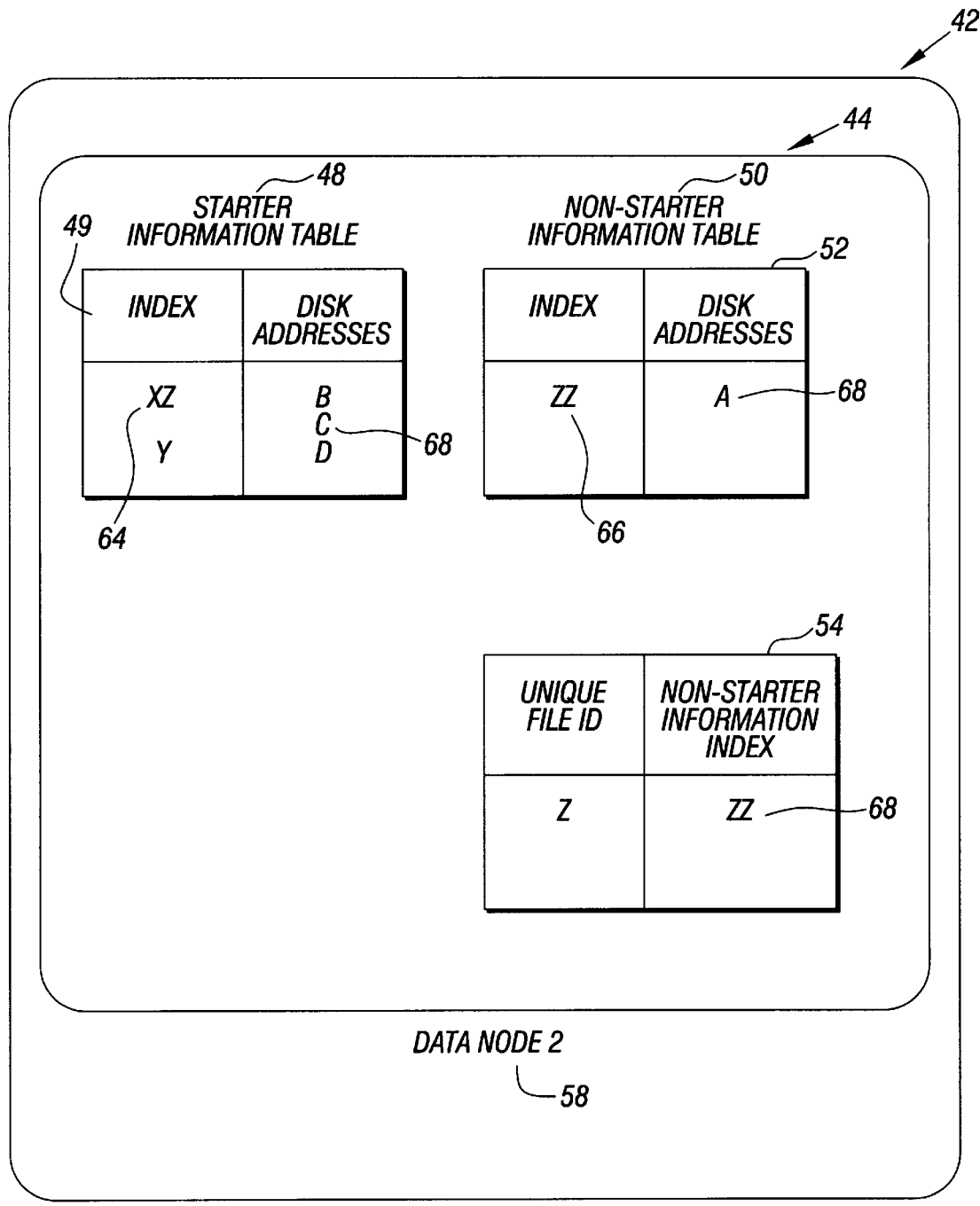
FIG. 9 describes the file meta-data structure in data node 2.

Referring to FIGS. 7, 8 and 9, the file access manager 44 for Data Nodes 3, 1 and 2 are depicted in greater detail as a simplified, general example of the organization of file access information for files A, B, C, D and E striped across the three Data Nodes.

In operation, in the preferred embodiment, each file has one or more data blocks of predetermined length. For instance, an exemplary data block size may include 1024 bytes. It should be understood that the length of a file data block can be any value determined by the file creator and does not depend upon the system configuration. Also, multiple file data blocks from the same file may be spread over each of the Data Nodes.

At the time of creation, each file receives a name. The file name is stored in a directory together with the File ID 60 which is used to access that file. When a file request is made for a file by name, the file name and its file ID 60 are retrieved from the data storage system 22 where it has been stored. From a user's perspective, a file appears as a single uniform, identical entity from any node. This is so, even though a file may comprise a single file data block on a single node or many file data blocks spread over many nodes.

In the preferred embodiment of the present invention, each file block of each file is accessed through a system-wide block identifier 56 which uniquely identifies the data block. The unique block identifier 56 is the key to obtaining file resource information for the file and its file blocks. In particular, the unique block identifier 56 contains the key 60 to the appropriate table entry 49 that describes the file and indicates the physical location of the data blocks on the disks 46.

In accordance with the method of the preferred implementation described hereinbelow of the present invention, a first block of records in a file is placed in a data node 42 that is determined by data for that file in the table entry 49 and "starts" the file. The next file data block being placed in the next node 42 as also indicated by that table entry 49, etc. In one example of a data block distribution method, consecutive data blocks are placed on consecutively numbered nodes 42 until the last node of pre-specified span is reached. This distribution method is called "striping" and for simplicity will be assumed to include a method and process of distributing data blocks across nodes preferably in a consecutive manner as assumed hereinbelow in the remaining section of this disclosure. The "starter" node 42 is defined then as the node at which record zero (0) for the file is written. The "span" designates the number of nodes 42 over which the file data blocks are spread.

More specifically, referring to FIG. 4, file A includes sets of file data blocks 70, 72, 74 labeled A. The Starter Node for file A is Data Node 1 and file A has a span of three because the blocks are spread over three Data Nodes 1, 2 and 3. File B includes sets of file data blocks 76, 78, 80 with a Starter Node of Data Node 2 and spans three Data Nodes 1, 2 and 3. File C includes sets of file data blocks 82, 84 with a Starter Node of Data Node 2 and spans two Data Nodes 2, 3. File D includes sets of file data block 86 with a Starter Node of Data Node 2 and is stored on Data Node 2. File E includes sets of file data blocks 88, 90 with a Starter Node of Data Node 3 and spans two Data Nodes 1, 3.

The sets of file data blocks 70–90 for each file A, B, C, D and E are logical file blocks which are mapped onto physical sectors on the disks 46. In the preferred embodiment, this mapping of logical file data blocks 70–90 onto physical disk space on the disk 46 is handled by the file access manager 44. The file access manager maps the logical file blocks 70–90 onto physical disk space using the indices 49, 52 to access the starter information 48 and non-starter information 50 which contain the maps.

In particular, starter information 48 and non-starter information 50 is stored on one or more tracks on the disks 46. It will be understood by those skilled in the art that information corresponding to the indices 49, 52 are stored and maintained in files containing Table 49 and 50 in each of the Data Nodes 1, 2, and 3 in a manner similar to single processor files systems. The information at indices 49, 52 contain the particular track and physical position within the track at which the previously stored logical file data blocks 70–90 are located as the disk addresses 68. There is no predetermined positional constraint on the position of any logical file data block within a disk 46. Therefore a file data block may be positioned anywhere within disk 46 not yet assigned to other file data blocks, so long as its position 68 is noted in the information at its indices 64 or 66. Referring to FIGS. 5, 6 and 7, the storage and retrieval of logical file blocks from files A, B, C, D and E is described. Referring to FIG. 7, in this example, the characters 2z, 1z, 2x represent file identifiers 60, the character z represents starter index keys 64 and the characters ZZ, YY and XX represent non-starter index keys 66.

Whenever a new file is created, an entry, consisting of its name together with the unique File ID 60 for that file, is placed, in sorted order, in a "well-known" distributed Directory file that was created when the distributed file system was initialized. To access the file by name, first the name is found in the directory file and the File ID 60 is retrieved. With this File ID, it is then easy to retrieve the starter and non-starter information on any Data Node on which data of the file is stored. The following paragraphs give an example of how this is done and is used to access a specific file data block. Subdirectories are treated similarly to files except that their data blocks are kept in the Directory file and accessed as file blocks in that file.

Suppose it is desired to access the 88th data block of File E. Performing a look up of File E in the sorted directory file retrieves its unique File ID, 32. (It is not required that the directory file entry, be on the same data node as the starter information 64 for the file E). The file ID, 3Z, for file E indicates that the starter information for file E is on Data Node 3 at index Z 64 in Data Node 3's starter information table 48. The starter information 68 at index Z 64 contains, inter alia, the file distribution data for file E, namely the information that the data blocks of File E are spread alternately on Data Node 3 and Data Node 1, starting with data block 0 on Data Node 3, data block 1 on Data Node 1, data block 2 on Data Node 3, and so forth, that is to say, all even numbered data blocks are located on Data Node 3 and all odd numbered data blocks are located on Data Node 1.

Thus, when file block 88 of File E, was allocated for storage on Data Node 3, the file access manager 44 mapped the physical position of file block 88 into the position for block 44 in the starter information 68 at starter information table entry z 64 in the starter table 48. That physical location on disk 46 is retrieved in the same way whenever data block 88 of File E is to be accessed in the future.

When file block 74 of file A was stored, file access manager 44 used the File ID, 1Z retrieved for File A from the Directory File, to access the starter information at index Z on Data Node 1. This indicated that data block 74 was on Data Node 3 (because 74=2 modulo 3). The file access manager 44 on Data Node 3 mapped the physical position of the logical file block 74 to data block 24 (i.e., 74÷3) in non-starter information of index 66 of the non-starter information table. In this example, the non-starter index key 66 is represented by YY. For the non-starter index 52, the non-starter index keys 66 are generated by the file access manager and are not the file block identifier 56. The correspondence between the unique block identifier 56, here 1z, and the non-starter key 66, here YY, is stored in mapping table 54. A hash list is an example of such a mapping table. It is understood by those skilled in the art that other mechanisms of correspondence between the block identifier 56 and non-starter key 66 may be used for such a table.

When file block 80 of file B and file block 84 of file C were stored on Data Node 3, the file access manager 44 mapped the physical location of the blocks in the disk address 68 of the non-starter index 52 corresponding to a non-starter index key 66. The unique block identifier 56 for each block was recorded in a hash list corresponding to the non-starter index key 66 for that block. In particular, the file identifier for block 80 of file B is 2x and the non-starter index key is XX. The file identifier for block 84 of file C is 2z and the non-starter index is ZZ.

FIGS. 8 and 9 show the starter information 48 and non-starter information 50 for each of the Data Nodes 1, 2 and 3 storing file blocks 70–90 from files A,B,C,D and E. The block identifier for each block 70–90 is different. If the block is mapped in the non-starter information 52, the file identifier includes the number of the Data Node which is the Starter Node for that file. For example, referring to FIG. 7, the file identifier 2z represents file C and the starter node for file C is Data Node 2. But in the Mapping Table 54, 2z points to ZZ which is the index of file blocks 84 of file C on Data Node 3 in the non-starter information table.

It should be emphasized again that the data access structure described above is file oriented and is not dependent upon the particular physical position on a disk drive where a file data block is stored. The essential key to locating a particular file blocks or set of file blocks is the unique file identifier which includes information sufficient to locate the starting information of the file. All of the distributed file block to disk address mappings can be found from that starting information. Sufficient information to do this is given to the user or his intermediary when he opens a file.

In the case where a file access manager 44, on a non-starter node, receives a request to retrieve blocks of a file block which does not exist, the file access manager 44 sends a query to the file access manager of the starter node for the file which the request is made. The query requests that the file access manager of the starter node resolve the conflict as to whether the file has just been created and the user is too early or the file has just been deleted and the user is too late. The file access manager of the starter node can respond to the query by (1) confirming that the file request is valid and so the requesting file access manager should allocate or write space for the file block, or (2) stating that the file block request is invalid as the file never existed or was deleted and so the file access manager should deny the request with an error showing that no such file exists. Thus, each file access manager only keeps file meta-data associate with files and file blocks that are stored on storage that it manages. This localization of file resource information contrasts with the global file manager methods shown in the prior art examples of FIG. 3.

If desired, parity blocks may be computed based on subsets of the file data blocks. It is to be emphasized that the parity block and its generation is optional and is based on a file parameter and is not limited by the position where any particular file data blocks are to be stored. Additional file parameters may include extended attribute file parameters such as, for example, security access levels or encryption information.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. A method to manage the decentralized access of files in a distributed computing system having a first file access manager controlling access to and having physical address information for only a first subset of logical file blocks of a stored file and a second file access manager controlling access to and having physical address information for only a second, disjoint, subset of logical file blocks of the stored file, the method comprising:

receiving, by the first file access manager, a request to access a specified logical file block of the stored file;

determining, by the first file access manager, the specified logical file block is in the second subset of logical file blocks of the stored file;

routing, by the first file access manager, the request to the second file access manager; and accessing, by the second file access manager, the specified logical file block.

2. The method of claim 1, wherein the act of receiving a request to access a specified logical file block of the stored file comprises receiving a file identifier associated with the stored file, the file identifier including a starter node attribute.

3. The method of claim 2, wherein the starter node attribute of the file identifier identifies the first file access manager.

4. The method of claim 3, wherein the act of identifying a second file access manager is based on logical-file-block-to-file-access-manager mapping information stored at the first file access manager.

5. The method of claim 1, wherein the first file access manager and the second file access manager execute on a common node of the distributed computer system.

6. The method of claim 1, wherein the first file access manager executes on a first node of the distributed computer system and the second file access manager executes on a different node of the distributed computer system.

7. The method of claim 1, wherein the requested access comprises a read operation.

8. The method of claim 1, wherein the requested access comprises a delete operation.

9. A memory for storing data for access by a file access manager program being executed on a distributed computer system node, comprising:
   a data structure stored in said memory, said data structure including,
      a first table for storing information indicating a physical storage location for one or more logical file blocks associated with a first stored file only if the first stored file has a zero record stored on a storage device controlled by the file access manager program; and
      a second table for storing information indicating one or more nodes in the distributed computer system, each indicated node having stored therein one or more logical file blocks associated with a second stored file, the second stored file without a zero record stored on a storage device controlled by the file access manager program.

10. The memory of claim 9, wherein the second table is without physical address information for those logical storage blocks associated with the second stored file.

11. The memory of claim 9, wherein the second table comprises a hash list.

12. A memory for storing data for use by a file access manager program being executed on a node in a distributed computer system to access a specified logical file block of a specified stored file, the memory comprising:
   a data structure stored in said memory, said data structure including,
      a node attribute to indicate one of a plurality of nodes in a distributed computer system, the indicated node having stored therein a zero record of the specified stored file;
      an index attribute to identify a location of logical-file-block-to-file-access-manager information at that node indicated by the node attribute; and
      a logical block attribute to indicate the specified logical block.

13. The memory of claim 12, wherein the logical block attribute comprises a data offset portion to indicate the position of the start of the specified logical file block relative to the start of the specified stored file.

14. The memory of claim 12, wherein the data structure further comprises a version attribute to indicate the version of the specified stored file.

15. The memory of claim 12, wherein the logical-file-block-to-file-access-manager information comprises physical address information only if the specified logical file block is stored in a media controlled by the file access manager program.

16. The memory of claim 12, wherein the logical-file-block-to-file-access-manager information does not comprise physical address information if the specified logical file block is stored in a media controlled by a second file access manager program.

* * * * *